(12) United States Patent
Nishio et al.

(10) Patent No.: US 8,003,914 B2
(45) Date of Patent: Aug. 23, 2011

(54) BUTT WELDING SYSTEM OF STEEL PLATE AND BUTT WELDING METHOD OF STEEL PLATE

(75) Inventors: Masahiro Nishio, Toyota (JP); Masaki Tanzawa, Toyota (JP); Masako Hida, Toyota (JP); Takayuki Shimizu, Toyota (JP); Keiichi Kashiwabara, Toyota (JP); Shuuji Sakemi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 598 days.

(21) Appl. No.: 12/083,552

(22) PCT Filed: Oct. 13, 2006

(86) PCT No.: PCT/JP2006/320884
§ 371 (c)(1),
(2), (4) Date: Apr. 14, 2008

(87) PCT Pub. No.: WO2007/043707
PCT Pub. Date: Apr. 19, 2007

(65) Prior Publication Data
US 2009/0159579 A1    Jun. 25, 2009

(30) Foreign Application Priority Data

Oct. 14, 2005   (JP) ................................. 2005-300537

(51) Int. Cl.
*B23K 26/20* (2006.01)
(52) U.S. Cl. ............. 219/121.63; 219/121.64; 228/212; 228/5.7; 269/37; 269/152

(58) Field of Classification Search ............. 219/121.63, 219/121.64, 121.82; 228/212, 5.7; 269/9, 269/37, 152
See application file for complete search history.

(56) References Cited

U.S. PATENT DOCUMENTS

| | | | | |
|---|---|---|---|---|
| 2,437,131 A | * | 3/1948 | Shaw .............................. | 72/305 |
| 4,867,835 A | * | 9/1989 | Poole ............................ | 156/507 |
| 5,674,420 A | * | 10/1997 | Broderick et al. ............ | 219/158 |
| 5,935,377 A | * | 8/1999 | Sergel et al. ................ | 156/406.4 |

FOREIGN PATENT DOCUMENTS

| | | |
|---|---|---|
| JP | 60-68520 | 5/1985 |
| JP | 5-30589 | 4/1993 |
| JP | 6-83180 U | 11/1994 |
| JP | 07-040075 | 2/1995 |
| JP | 2629710 | 1/1997 |

(Continued)

*Primary Examiner* — Samuel M Heinrich
(74) *Attorney, Agent, or Firm* — Finnegan, Henderson, Farabow, Garrett & Dunner, LLP (57) ABSTRACT

A butt welding system and a butt welding method of steel plate by which the quality of a product can be ensured. Butting portions of blank members (1,2) to be joined together are butted and a predetermined butting load is applied to the butting portion, wherein the blank members (1,2) are moved relatively in the direction of the welding line thus matching the butting portions. Protrusions and recesses formed on each butting portion of each blank member (1,2) are flattened, whereby linear precision at each butting portion of each blank member (1,2) is enhanced as compared with a case where the butting portions are not matched. Since the gap is reduced extremely at the butting portion, welding is facilitated at the butting portion. Good welding beads are thereby obtained at the butting portion and the quality of a product is ensured.

8 Claims, 9 Drawing Sheets

FOREIGN PATENT DOCUMENTS

| | | |
|---|---|---|
| JP | 10-249560 | 9/1998 |
| JP | 2936942 | 6/1999 |
| JP | 2000-246472 | 9/2000 |
| JP | 2001-287090 | 10/2001 |
| JP | 2002-210574 | 7/2002 |
| JP | 2003-275883 | 9/2003 |
| JP | 2003-294643 | 10/2003 |
| JP | 2004-154842 | 6/2004 |
| JP | 2005-193255 | 7/2005 |
| JP | 2006-7265 | 1/2006 |

* cited by examiner

BUTT WELDING SYSTEM OF STEEL PLATE AND BUTT WELDING METHOD OF STEEL PLATE

TECHNICAL FIELD

The present invention relates to butt welding systems of steel plate and butt welding methods of steel plate and, in particular, to a butt welding system of steel plate and a butt welding method of steel plate for butt-welding of blanked steel plates.

BACKGROUND ART

Conventionally, in automobile outer-panel components and others, tailored blank members have been used that are formed by jointing steel plates different from each other in plate thickness and mechanical characteristics, in order to reduce the weight of a vehicle body and improve collision safety performance. For example, when blanked steel plates (hereinafter referred to as blank members) are butted together and butting portions of these blank members (hereinafter simply referred to as butting portions) are radiated with laser light for butt welding of the blank members to obtain a tailored blank member, if a gap of the butting portions is larger than an allowance value (the magnitude of an allowable gap), a welding defect may occur, such as a pinhole. Thus, management of the gap of the butting portions is extremely important in butt welding of blank members. For this reason, as means of making the gap of the butting portions equal to or smaller than the allowable value, linear precision of each butting portion of each blank member may be increased. However, when each butting portion of each blank member is formed through blanking, precision of a blanking mold (blanking blade) is required to be held high, and operators are therefore required to have high technical skills and strict management of blanking mold is also required.

Although linear precision of each butting portion of each blank member can be increased also through a cutting process using a laser, facility and manufacturing costs are increased. To get around this, Patent document 1 describes a butt jointing device that aligns each butting portion of each blank member and increasing linear precision of the butting portion by applying a butting load to the butting portion with the blank members being butted together and then releasing the butting load. However, in the butt jointing device according to Patent document 1, when relatively large projections and recesses and burrs are present on a butting portion of any blank member, a gap occurs in the butting portion when the butting load is released, thereby possibly causing a welding defect, such as a pinhole, on the butting portion. Moreover, in the butt jointing device of this type, a clamp device that holds the blank members is dedicatedly manufactured in accordance with the shape of each blank member, and therefore there is a problem in general versatility. To get around this, a plurality of clampers each driven by an air cylinder may be disposed along the butting portion, but many air cylinders are required, thereby increasing manufacturing cost.

On the other hand, in some conventional laser welding devices, in order to ensure welding quality, a laser output of a power laser (laser light for actual use in welding) may be regularly measured using a power meter to correct the laser output of an oscillator. However, since measurement takes some time (10 to 60 seconds), no laser output can be measured for each product in view of problems of productivity, and a large number of products with welding defects may have been manufactured at the time of discovering a problem with laser output. Furthermore, some conventional laser welding devices include a pinhole detecting device that determines the presence or absence of a pinhole in a welding bead based on image data shot by a visual sensor, such as a CCD camera. However, since image processing takes some time, pinhole detection and welding cannot be simultaneously performed, and pinhole detection is performed exclusively in an examining process after welding under present circumstances. For this reason, an enormous number of processes are required in the examining process, and a system has been therefore demanded capable of detecting a pinhole simultaneously with welding.

Patent document 1: Japanese Patent Application Publication No. JP-A-2003-275883

DISCLOSURE OF THE INVENTION

Problems to be Solved by the Invention

The present invention has been devised in view of the above-described circumstances, and a first object is to provide a butt welding system of steel plate by which the quality of a product can be ensured.

Also, a second object is to provide a butt welding method of steel plate by which the quality of a product can be ensured.

Means to Solve the Problems

To achieve the above first object, according to a first aspect of the present invention, a butt welding system is provided in which steel plates are welded at a butting portion for jointing, the system including: gripping means for gripping the steel plates to be jointed together near butting portions of the steel plates; butting means for butting the steel plates gripped by the gripping means at their butting portions, and for applying a predetermined butting load to the butting portion of the butted steel plates; matching means for relatively moving the steel plates butted by the butting means so as to match-slide the butting portions of the steel plates; and welding means for welding the butting portions of the steel plates along a welding line.

According to a second aspect of the present invention, in the butt welding system according to the first aspect, the gripping means includes: a base that extends along the welding line and supports portions on lower surfaces of the steel plates near the butting portions; a clamp bar provided above the base so as to face the base; a plurality of clampers vertically disposed on the clamp bar so as to be vertically movable and arranged along the clamp bar; a plurality of compression springs interposed between the clamp bar and each clamper and disposed in parallel for each clamper; and clamp-bar driving means for driving the clamp bar in a vertical direction, wherein the spring force of one or more of the compression springs disposed closer to an end of each clamper is set larger than that of one or more of the compression springs disposed closer to a center.

According to a third aspect of the present invention, in the butt welding system according to the first or second aspect, in the gripping means, each clamper is tilted with respect to the clamp bar so that an end closer to the center of the clamper bar is positioned lower and that one or more of the clampers disposed closer to the center of the clamper bar are positioned lower.

According to a fourth aspect of the present invention, in the butt welding system according to any one of the first to third aspects, the welding means is a laser welding device that radiates the butting portions with laser light generated by an oscillator from a laser head, and includes pinhole detecting means for detecting a pinhole of a welding bead based on an intensity of reflected light of the laser light in an optical system accommodated in the laser head.

According to a fifth aspect of the present invention, in the butt welding system according to any one of the first to fourth aspects, the pinhole detecting means includes: a photosensor provided to the laser head to capture the reflected light of the laser light; and a pinhole detection control device in which the reflected light captured by the photosensor is separated into high-frequency components and low-frequency components, in which a difference between the high-frequency components and the low-frequency components of the reflected light, or a quotient of the high-frequency components and the low-frequency components, is used as reflected-light intensity data, and in which a pinhole is detected when the reflected-light intensity data falls below a threshold successively by a predetermined number of pieces of data.

According to a sixth aspect of the present invention, in the butt welding system according to any one of the first to fifth aspects, laser-output adjusting means is provided for adjusting a laser output of the oscillator based on an intensity of transmitted light or reflected light of the laser light in an optical component of the laser head.

According to a seventh aspect of the present invention, in the butt welding system according to any one of the first to sixth aspects, the laser-output adjusting device includes: a photosensor provided to the laser head to capture the transmitted light or reflected light of the laser light; and a laser-output control device by which a laser output of the laser light is measured based on the transmitted light or reflected light of the laser light captured by the photosensor, and by which a laser-output adjusting signal calculated based on the measurement results is output to the oscillator.

To achieve the above second object, according to an eighth aspect of the present invention, a butt welding method of welding steel plates at a butting portion for jointing is provided, the method comprising: gripping the steel plates near butting portions of the steel plates; then butting the steel plates together at their butting portions and applying a predetermined butting load to the buffing portion of the steel plates; in this state, relatively moving the steel plates to match the butting portions of the steel plates; and then welding the butting portions of the steel plates.

According to a ninth aspect of the present invention, in the butt welding method according to the eighth aspect, the method is applied to butt welding when at least one of the steel plates to be jointed together is a welding steel plate.

Therefore, in the first aspect of the present invention, the portions near the butting portions of the steel plates to be jointed together are gripped by the gripping means. Also, each gripped steel plate has its butting portion butted by the butting means, and the predetermined butting load is applied to the butting portion. Then, after the butting portions of the steel plates are matched by the matching means, the butting portions are welded by the welding means.

In the second aspect of the present invention, when the clamp bar is lowered by the clamp-bar driving means, the portion near each butting portion of each positioned steel plate is gripped by each clamper. At this time, each clamper is pressed onto the steel plate by the plurality of compression springs interposed between each clamper and the clamp bar. Then, since the spring force of the compression springs of each clamper that are disposed outside is higher than the spring force of the compression springs that are disposed closer to the center, both ends of each clamper are strongly pressed onto the blank member.

In the third aspect of the present invention, even when the center of the clamp bar is deformed in a convex shape due to the load acting on the clamp bar, the clampers disposed closer to the center of the clamp bar are strongly pressed on the blank member.

In the fourth aspect of the present invention, a pinhole occurring during welding can be instantaneously detected.

In the fifth aspect of the present invention, the reflected light captured by the photosensor is separated into high-frequency components and low-frequency components, a difference between the high-frequency components and the low-frequency components of the reflected light, or a quotient of the high-frequency components and the low-frequency components, is used as reflected-light intensity data, and a pinhole is detected when the reflected light intensity data falls below a threshold successively by a predetermined number of pieces of data.

In the sixth aspect of the present invention, laser output measurement can be performed within an extremely short time.

In the seventh aspect of the present invention, the laser output of the laser light is measured based on transmitted light or reflected light of the laser light captured by the photosensor, and a laser-output adjusting signal calculated based on the measurement results is output to the oscillator.

In the eighth aspect of the present invention, the portion near each butting portion of each steel plate to be jointed together is gripped. Each gripped steel plate has its butting portion butted, and the predetermined butting load is applied to the butting portion. In this state, after the butting portions of the steel plates are matched, the butting portions are welded.

In the ninth aspect of the present invention, the butt welding method according to the eighth aspect is applied to the case where, for example, steel plates to be laser-welded are welded at their butting portions for jointing.

EFFECTS OF THE INVENTION

A butt welding system and butt welding method can be provided by which the quality of a product can be ensured.

DESCRIPTION OF REFERENCE NUMERALS 1, 2 blank member, 1a, 1b butting portion, 3, 4 magnet conveyer (conveyer), 7 workpiece gripping device (gripping means), 8 butting portion, 9 workpiece butting device (butting means), 10 workpiece matching device (matching means), 21 jig base (base), 22 clamp bar, 23 clamper, 25 compression coil spring (compression spring), 32 reflected light, 33 photosensor (pinhole detecting means), 37 photosensor (laser-output adjusting means)

BEST MODES FOR CARRYING OUT THE INVENTION

Figure 1:
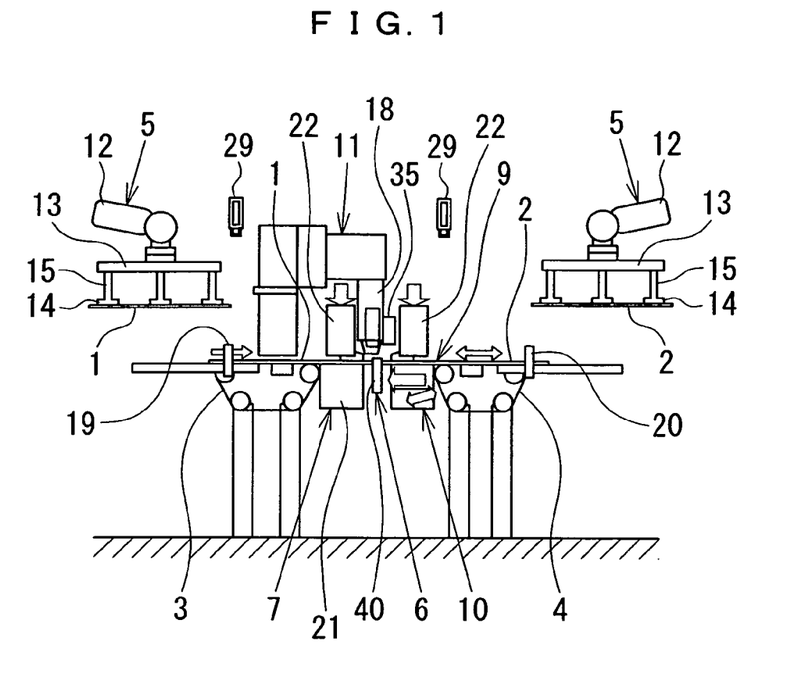
FIG. 1 is a schematic drawing of the present butt welding system.

An embodiment of the present invention is described based on FIGS. 1 to 14. As depicted in FIG. 1, the present butt welding system includes a workpiece supply device 5 in which blank members 1, 2 (steel plates) are supplied (loaded) one by one onto magnet conveyers 3, 4, respectively; a workpiece positioning device 6 by which the blank members 1, 2 loaded on the magnet conveyers 3, 4, respectively are positioned at their predetermined position; a workpiece gripping device 7 (gripping means 7) by which the blank members 1, 2 positioned by the workpiece positioning device 6 are gripped near butting portions 1a, 2a of the blank members 1, 2, respectively; a workpiece butting device 9 (butting means) by which the blank members 1, 2 gripped by the workpiece gripping device 7 are butted at their butting portions 1a, 2a, respectively and a predetermined butting load is applied to a butting portion 8 of the blank members 1, 2; a workpiece matching device 10 (matching means) by which the blank members 1, 2 butted by the workpiece butting device 9 are relatively moved in a direction of a welding line (viewed from the angle of FIG. 1), thus matching the butting portions 1a, 2a of the blank members 1, 2; and a welding device 11 (welding means) by which the butting portion 8 of the blank members 1, 2 matched by the workpiece matching device 10 is laser-welded along the welding line.

Figure 2:
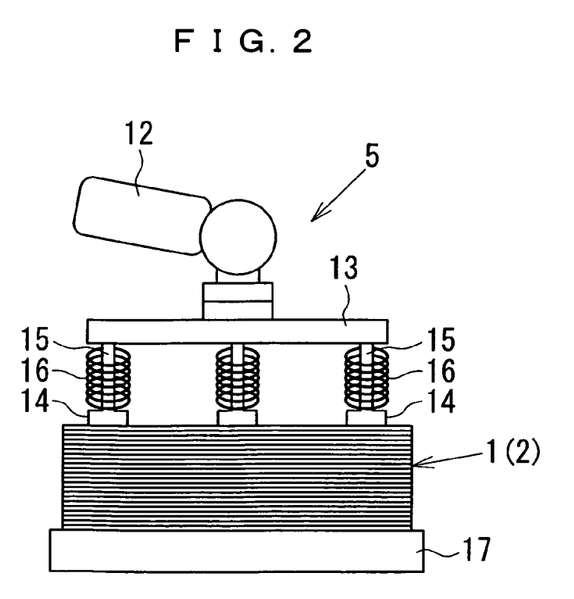
FIG. 2 is an illustrative drawing of a workpiece supply device, depicting a state where an uppermost blank member loaded on a material palette is sucked by each suction pad.
Figure 3:
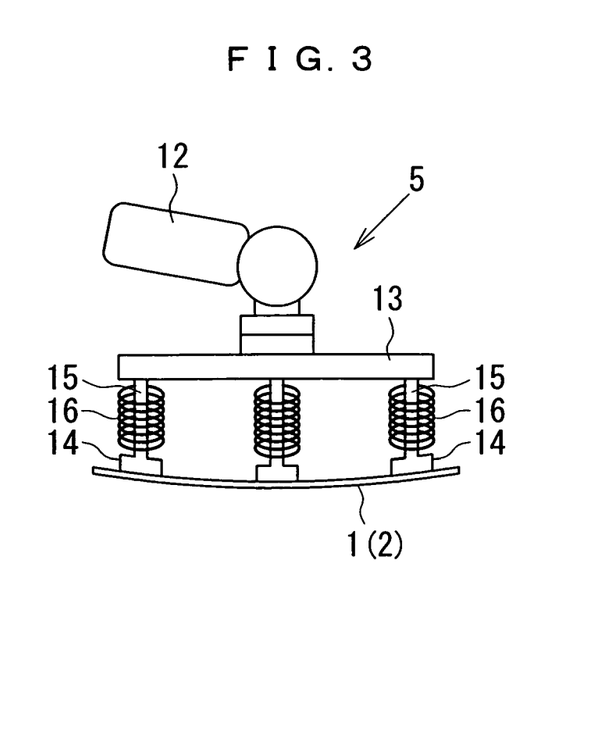
FIG. 3 is an illustrative drawing of the workpiece supply device, depicting a blank member being conveyed.

As depicted in FIGS. 2 and 3, the workpiece supply device 5 includes a robot arm 12 operating under the control of a robot control device, a pad frame 13 mounted onto the robot arm 12, and a plurality of (for example, a total of nine in 3×3 arrangement) suction pads 14 (vacuum pad), all of which are provided for each blank member 1, 2. Each of the suction pads 14 is mounted at a lower end of each shaft 15 vertically disposed on the pad frame 13 so as to be vertically movable with respect to the pad frame 13. Each shaft 15 has a compression coil spring 16 extrapolated, the compression coil spring 16 pressing the suction pad 14 onto either of the blank members 1, 2 during suction. The workpiece supply device 5 positions each pad frame 13 by means of each robot arm 12 at a suction position just above either of the blank members 1, 2 loaded on each material palette 17, and thus attaches each suction pad 14 of each pad frame 13 onto either of the blank members 1, 2. In this state, when each pad frame 13 is moved upward, only one sheet of blank members 1, 2 is picked up from each material palette 17.

Here, in the workpiece supply device 5, in a front view (seen from the angle of FIG. 3), the length of each shaft 15 disposed at the center of each pad frame 13 is set longer than that of each shaft 15 disposed in other rows (outside rows). Consequently, as depicted in FIG. 3, when each blank member 1, 2 is conveyed, each blank member 1, 2 sags by self weight so that the center is positioned lower, thereby equalizing the load onto each suction pad 14. Therefore, a drop from any suction pad 14 due to concentration of the load onto any particular suction pad 14 can be prevented. Also, each material palette 17 is provided with a magnet floater that floats one end of the uppermost blank member 1, 2 to prevent several blank members 1, 2 from being picked up at a time. As depicted in FIG. 1, in a front view (seen from the angle of FIG. 1), the workpiece positioning device 6 includes magnet conveyers 3, 4 disposed on both left and right sides of a power motor head 18 of the welding device 11, wherein the blank members 1, 2 supplied by the workpiece supply device 5 are held (sucked) by magnetic force of the magnet conveyers 3, 4.

Figure 4:
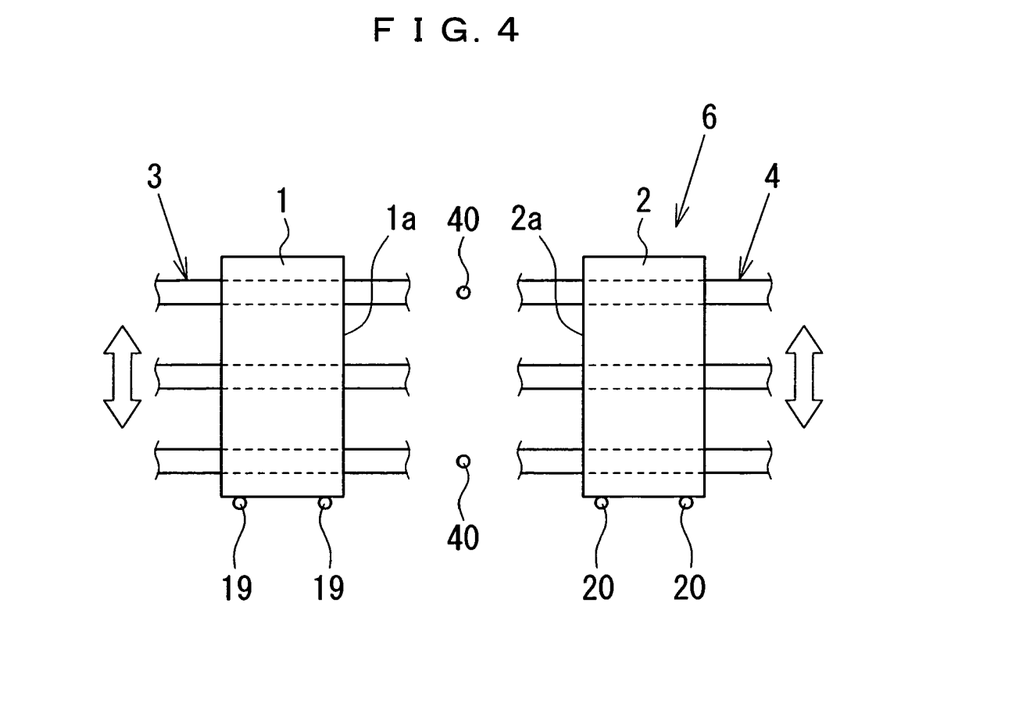
FIG. 4 is an illustrative drawing of a workpiece positioning device, depicting a state where a blank member is positioned by a pair of positioning pins.
Figure 5:
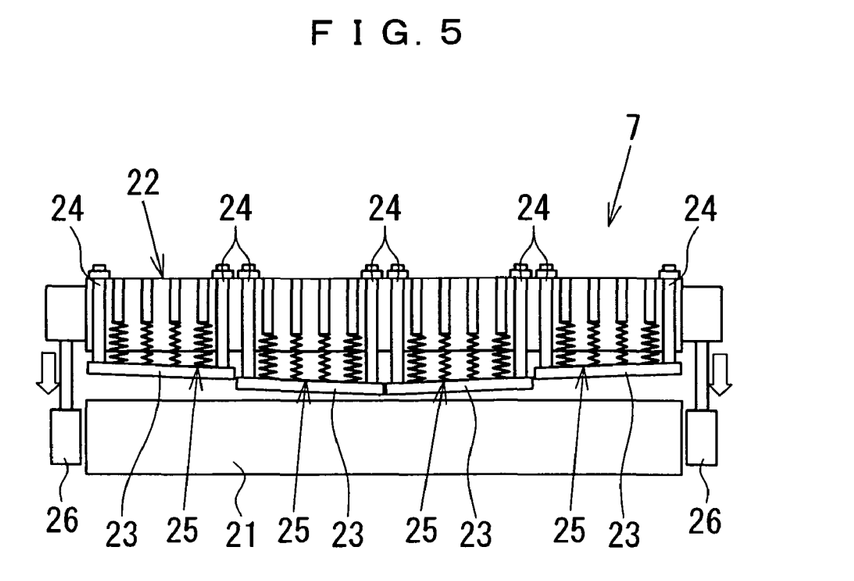
FIG. 5 is a front view of a workpiece gripping device.

Also, as depicted in FIG. 4, the workpiece positioning device 6 includes a pair of positioning pins 19, 20 protruding from a conveyance surface (upper surface) of each magnet conveyer 3, 4 on one side (lower side as viewed in FIG. 4) in a direction of the welding line (vertical direction as viewed in FIG. 4) of the magnet conveyer 3, 4. In the workpiece positioning device 6, as each magnet conveyer 3, 4 is moved to one side in the direction of the welding line, each blank member 1, 2 loaded on the magnet conveyers 3, 4, respectively, is moved to one side in the direction of the welding line. Then, the one side of each blank member 1, 2 (lower side as viewed in FIG. 4) abuts on each pair of the positioning pins 19, 20, so that each blank member 1, 2 can be positioned in the direction of the welding line. Furthermore, as depicted in FIGS. 1 and 4, the workpiece positioning device 6 has, between the magnet conveyers 3, 4 provided in parallel, a plurality of positioning pins 40 that raise or lower to extend from or retract into the conveyance surface (upper surface) of each magnet conveyer 3, 4, the positioning pins 40 being disposed in line along the direction of the welding line (vertical direction as viewed in FIG. 4). In the workpiece positioning device 6, after each blank member 1, 2 is positioned in the direction of the welding line by each of the positioning pins 19, 20, each magnet conveyer 3, 4 is driven forward, thereby moving each blank member 1, 2 forward (the magnet conveyer 3 moves the blank member 1 rightward as viewed in FIG. 4, whilst the magnet conveyer 4 moves the blank member 2 leftward as viewed in FIG. 4). Then, each butting portion 1a, 2a of each blank member 1, 2 abuts on the positioning pins 40, so that each blank member 1, 2 can be positioned in a butting direction (horizontal direction as viewed in FIG. 4). As depicted in FIG. 5, the workpiece gripping device 7 includes a clamp unit composed of a jig base (base) 21 extending in the direction of the welding line (viewed from the angle of FIG. 1) and a clamp bar 22 that is vertically moved to come close to or go away from the jig base 21. The clamp unit includes a plurality of (four in the present embodiment) clampers 23 vertically disposed on the clamp bar 22 and arranged in line along the clamp bar 22.

Figure 6:
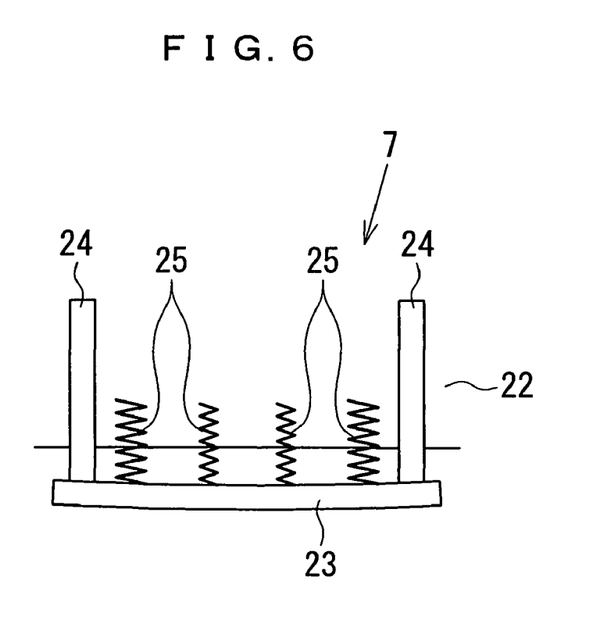
FIG. 6 is an illustrative drawing of the workpiece gripping device, depicting a state where compression coil springs are interposed in parallel between a clamper and a clamp bar.

As depicted in FIG. 6, the clamper 23 has both ends suspended by a pair of shafts 24 that are vertically movable with respect to the clamp bar 22. Disposed between the clamper 23 and the clamp bar 22 and between the pair of shafts 24 are a plurality of (four in the present embodiment) compression coil springs 25 (compression springs). In the workpiece gripping device 7, the spring force of the compression coil springs 25 of each clamper 23 disposed outside is set larger (twice to four times) than that of the compression coil springs 25 disposed inside. Consequently, in the workpiece gripping device 7, the center of each clamper 23 can be prevented from being warped in a recessed shape, thereby allowing each clamper 23 to make a close contact with each blank member 1, 2 on the jig base 21. Also, in the workpiece gripping device 7, the shafts 24 disposed closer to the center of the clamp bar 22 are formed longer.

Therefore, as depicted in FIG. 5, the clampers 23 are provided in a tilted manner so that their ends closer to the center of the clamp bar 22 are positioned lower, and the clampers 23 disposed closer to the center of the clamp bar 22 are mounted lower. Consequently, in the workpiece gripping device 7, during gripping of each blank member 1, 2, even when the clamp bar 22 is deformed in a protruded shape due to the load of clamp cylinders 26, the clamping force (gripping force) of the clampers 23 disposed at the center is prevented from being made lower than that of the clampers 23 disposed outside, thereby preventing an insufficient close contact between each blank member 1, 2 and the jig base 21. Here, the clamp surface of each clamper 23 has projections and recesses for increasing the gripping force for the blank members 1, 2.

Figure 7:
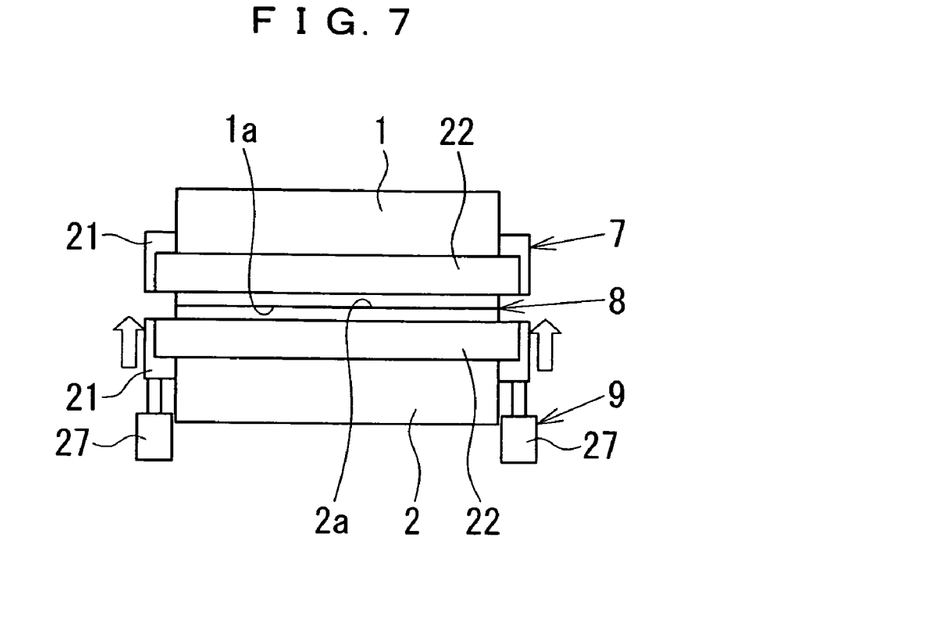
FIG. 7 is a plan view depicting a state where each blank member gripped by each clamp unit of the gripping device is butted by a workpiece butting device.
Figure 8:
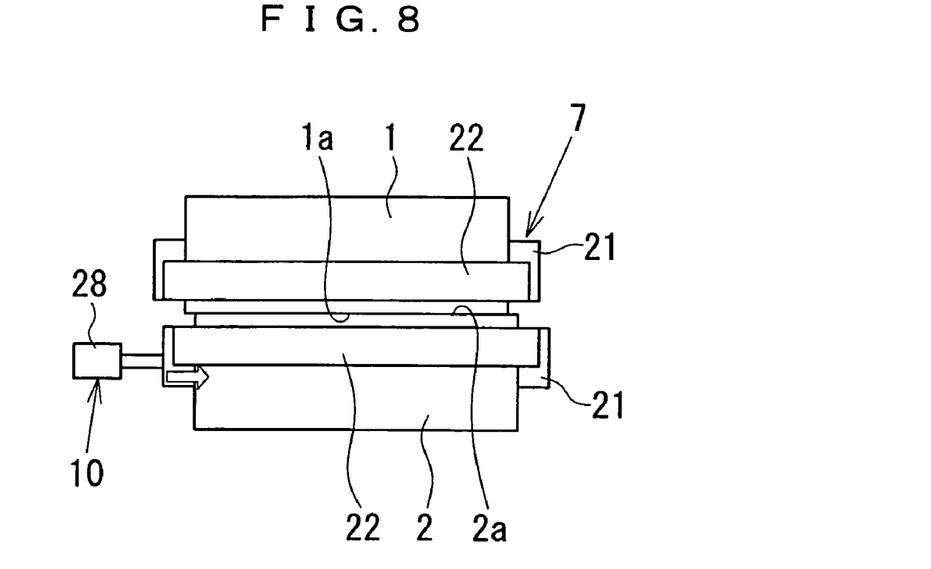
FIG. 8 is an illustrative plan view of a workpiece matching device, depicting a state where a blank member on a movable side is caused to reciprocate in a welding-line direction with respect to a blank member on a fixing side.

As depicted in FIG. 7, the workpiece butting device 9 includes a pair of butting cylinders 27 that move one clamp unit toward the other clamp unit. With the pair of butting cylinders 27, the one clamp unit that clamps (grips) the blank member 2 on a movable side is moved toward the other clamp unit that clamps the blank member 1 on a fixing side, thereby butting the butting portion 1a of the blank member 1 and the butting portion 2a of the blank member 2 together, and a predetermined butting load (10 to 50 kN/m) is applied to the butting portion 8 of the blank member 1 and the blank member 2 (hereinafter simply referred to as butting portion 8). Also, as depicted in FIG. 8, the workpiece matching device 10 includes a matching cylinder 28 that causes the other clamp unit to reciprocate toward the one clamp unit in the direction of the welding line (horizontal direction as viewed in FIG. 8).

The workpiece matching device 10 causes the other clamp unit to make one reciprocating motion by a moving distance of 5 mm in one direction, with the butting load being applied to the butting portion 8 by the workpiece butting device 9, thereby matching the butting portion 1a (end face) of the blank member 1 and the butting portion 2a (end face) of the blank member 2 to narrow the gap of the butting portion 8 (to 0.1 mm or less in the present embodiment). Here, the clamp unit driven by the matching cylinder 28 is guided by a direct-acting guide in the direction of the welding line at the time of matching the blank members 1, 2. The welding device 11 is composed of an oscillator, an optical system, a power motor head 18, a laser-head driving mechanism, and a laser control device. Laser light generated by the oscillator is applied from the power motor head 18 to the butting portion 8 via the optical system. Under the control of the laser control device, the power motor head 18 is then moved so that a focus point of the laser light applied to the butting portion 8 is moved along the welding line, and that the butting portion 8 is welded to joint the blank member 1 and the blank member 2 together.

Figure 9:
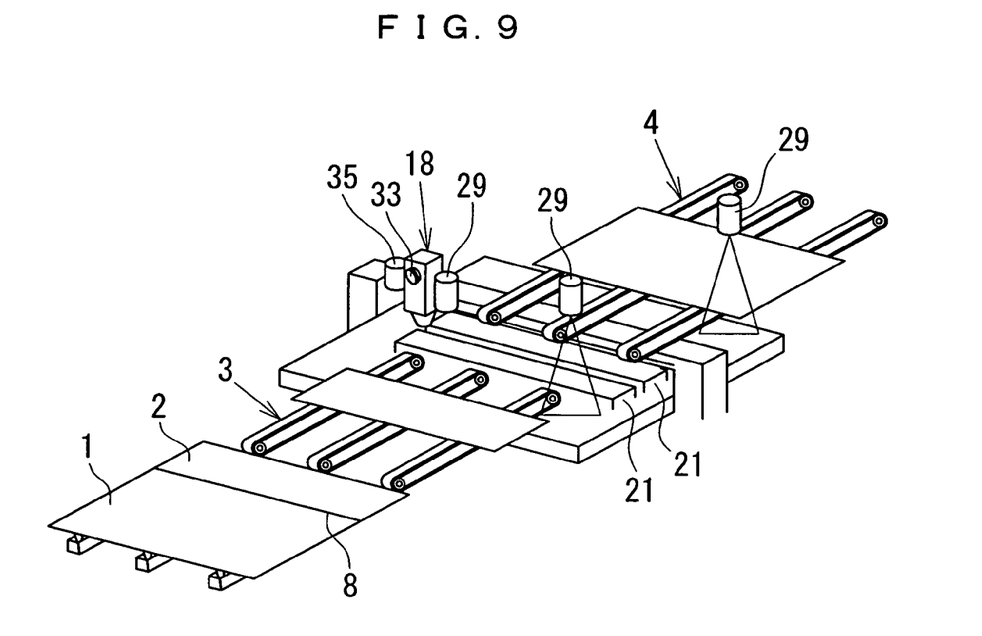
FIG. 9 is a perspective view depicting an arrangement of a positioning-state monitoring device and CCD cameras of a bead-shape examining device near a laser head.

Also, the butt welding system includes a positioning-state monitoring device that measures the position of each blank member 1, 2 positioned by the workpiece positioning device 6 (the blank members 1, 2 just before being gripped by the clamp units of the workpiece gripping device 7) in the direction of the welding line and the gap of the butting portion 8 of the blank members 1, 2 that have been matched by the workpiece matching device 10. The positioning-state monitoring device includes, as depicted in FIG. 9, a plurality of CCD cameras 29 and a state determining device 30 equipped with a microcomputer. The position of each blank member 1, 2 in the direction of the welding line and the gap of the butting portion 8 are measured based on image data obtained by processing an image shot by each CCD camera 29, and OK/NG determination is made based on the measurement results. Here, conventional control logic is used for image processing and determination processing as appropriate.

Figure 10:
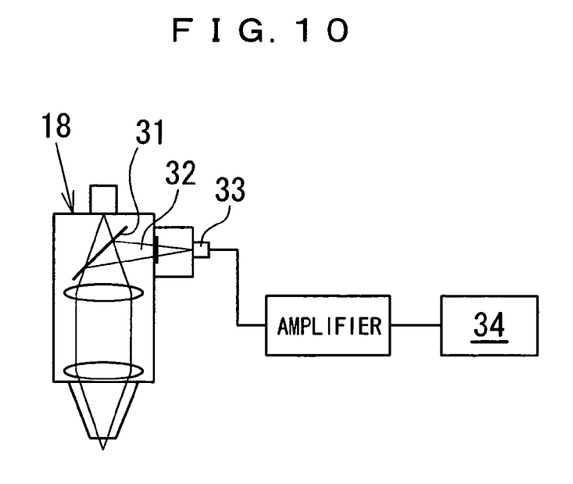
FIG. 10 is a schematic drawing of a pinhole detecting device.

Also, the butt welding system includes a pinhole detecting device (pinhole detecting means) that detects a pinhole (welding defect) of the butting portion 8 laser-welded by the welding device 11 (hereinafter referred to as welded portion 8). The pinhole detecting device includes, as depicted in FIG. 10, a low-reflection mirror 31 provided in an optical system accommodated in the power motor head 18, a photosensor 33 that captures laser light 32 reflected from the low-reflection mirror 31 (hereinafter referred to as reflected light 32), and a pinhole determining device 34 equipped with a microcomputer, which determinates the presence or absence of a pinhole (welding defect) in the welded portion 8 based on the intensity of the reflected light 32 captured by the photosensor 33. The pinhole detecting device, as depicted in FIG. 11, successively measures the intensity of the reflected light 32 (hereinafter referred to as reflected-light intensity) during welding (step 1 in FIG. 11).

Figure 11:
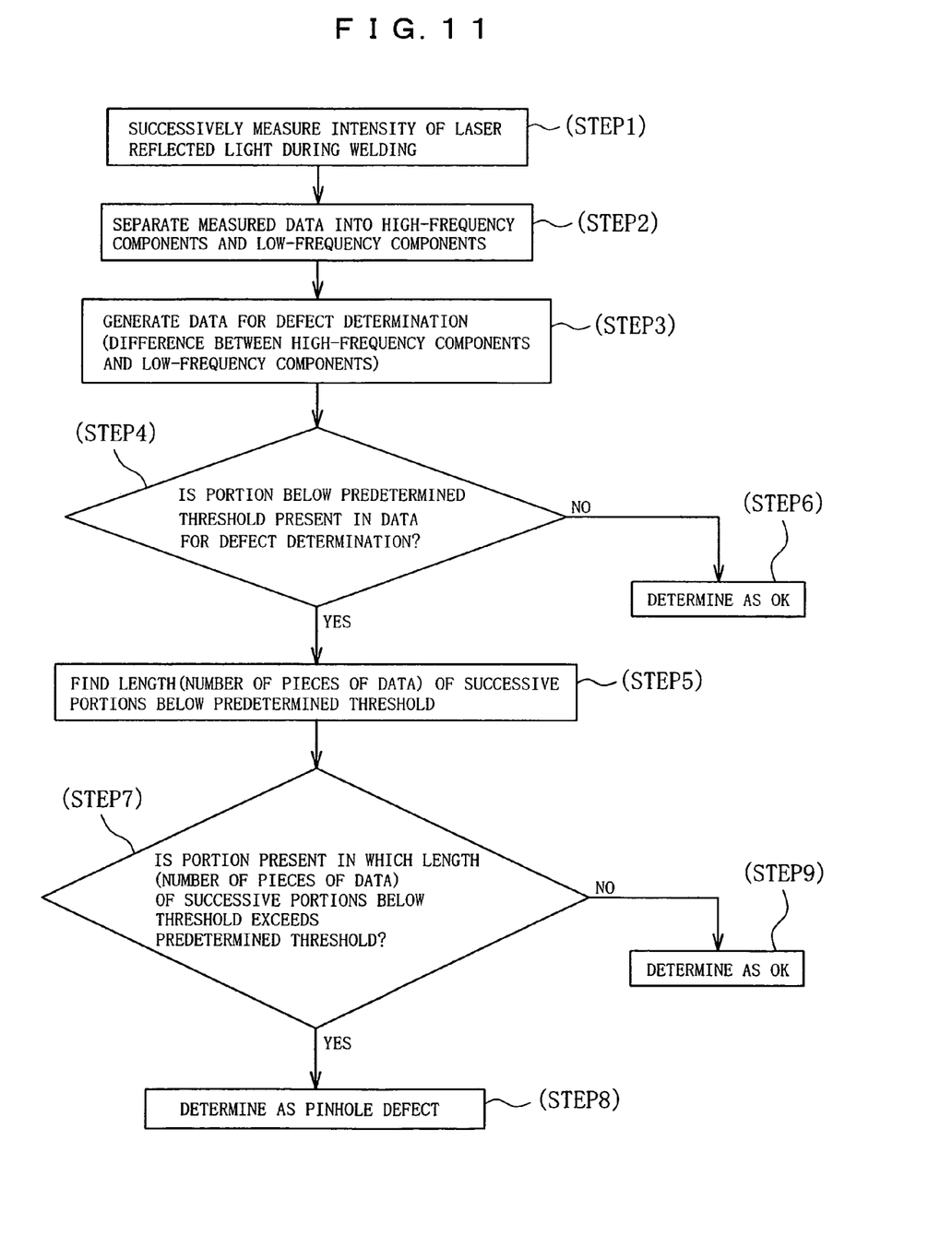
FIG. 11 is a flowchart of the pinhole detecting device.

The pinhole determining device 34 processes the measured reflected-light intensity (measurement results) (through FFT processing, for example) to separate the intensity into high-frequency components including a change in reflected-light intensity due to a pinhole and low-frequency components including successive changes of noise and the reflected light 32 (step 2 in FIG. 11). Also, the pinhole determining device 34 calculates a difference between the high-frequency components (100 to 500 Hz) and the low-frequency components (10 to 50 Hz) of the reflected-light intensity to generate data for pinhole determination based on the calculation results (step 3 in FIG. 11). Furthermore, the pinhole determining device 34 compares the data for pinhole determination and a first threshold stored in a storage unit (memory) (step 4 in FIG. 11), and if any portion of the data for pinhole determination is below the first threshold in the welded portion 8 (if determined YES at step 4 in FIG. 11), calculates the length (the number of pieces of data) of the portion of the data for pinhole determination in the welded portion 8 (step 5 in FIG. 11).

Here, in step 4 of FIG. 11, if no portion of the data for pinhole determination is below the first threshold (if determined NO at step 4 in FIG. 11), determination is made as OK (no pinhole) (step 6 in FIG. 11). Also, the pinhole determining device 34 compares the length (the number of pieces of data) of the portion of the data for pinhole determination below the first threshold and a second threshold stored in the storage unit (memory) (step 7 in FIG. 11). If the length (the number of pieces of data) of the portion of the data for pinhole determination below the first threshold in the welded portion 8 includes a portion above the second threshold (if determined YES at step 7 in FIG. 11), final determination is made as NG (pinhole detected) in the welded portion 8 (step 8 in FIG. 11). Furthermore, at step 7 in FIG. 11, if the length (the number of pieces of data) of the portion of the data for pinhole determination below the first threshold in the welded portion 8 does not include any portion above the second threshold (if determined NO at step 7 in FIG. 11), determination is made as OK (no pinhole) (step 9 in FIG. 11).

Here, if any pinhole occurs in the welded portion 8, a power laser (laser light applied from the power motor head 18 to the butting portion 8) is not used for welding but passes through the butting portion 8 toward the rear side of the blank members 1, 2, leading to a decrease in the reflected-light intensity because of a steady state (state without a pinhole). The pinhole detecting device utilizes such a phenomenon to standardize the reflected-light intensity. As depicted in FIG. 9, the butt welding system includes a bead-shape examining device comprising: a light source from which laser light in a slit shape is applied toward the welded portion 8; a CCD camera 35 that shots an image of the welded portion 8 radiated with the laser light in a slit shape by the light source; and a bead determining device equipped with a microcomputer. The bead-shape examining device measures, simultaneously with welding, the bead height of the welded portion 8 and the height of each blank member 1, 2 on both sides of each welded portion 8 based on image data obtained by processing an image shot by the CCD camera 35, and makes OK/NG determination for the welded portion 8 based on the measurement results. Here, conventional control logic is used for image processing and determination processing as appropriate.

Figure 12:
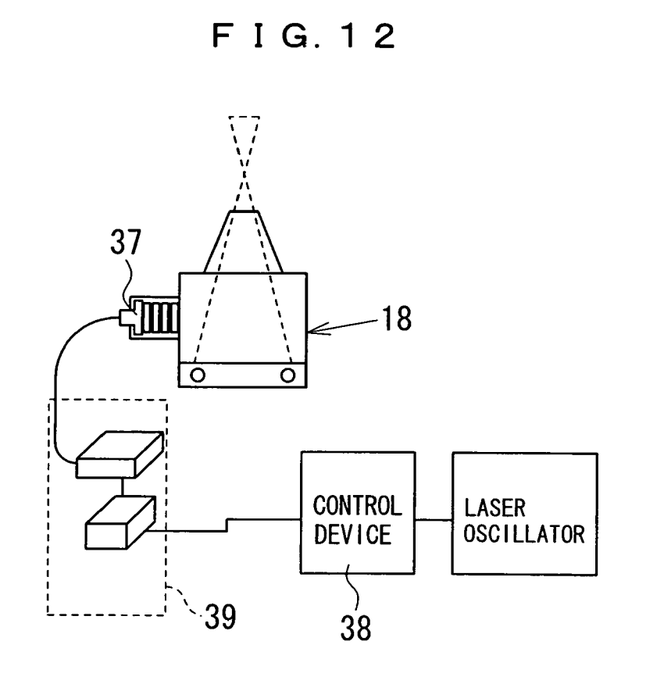
FIG. 12 is a schematic drawing of a laser-output adjusting device.

Furthermore, the butt welding system includes a laser-output adjusting device that measures a laser output of the power laser (an output of laser light for actual use in welding: used separately from the laser output of the oscillator) for a short time (0.5 sec) and adjusts the laser output of the oscillator based on the measurement results. The laser-output adjusting device includes, as depicted in FIG. 12, a photosensor 37 that captures transmitted light (laser light) of the optical system accommodated in the power motor head 18 and a control device 38 equipped with a microcomputer. In the laser-output adjusting device, laser light captured by the photosensor 37 is converted to an electrical signal by an amplifier 39 and a laser output of the power laser is calculated based on the electrical signal by the control device 38. Here, the control device 38 uses a predetermined output conversion formula for calculating the laser output of the power laser from the electrical signal obtained through conversion by the amplifier 39.

Also, in the laser-output adjusting device, the control device 38 makes a temperature drift correction for the laser output value of the power laser calculated using the output conversion formula. Furthermore, in the laser-output adjusting device, the control device 38 calculates an under- or over-ratio of the laser output value of the power laser subjected to the temperature drift correction to each of a preset upper limit value and lower limit value of the laser output of the power laser, and adjusts the laser output of the oscillator based on the calculated under- or over-ratio of the laser output of the power laser.

Figure 14:
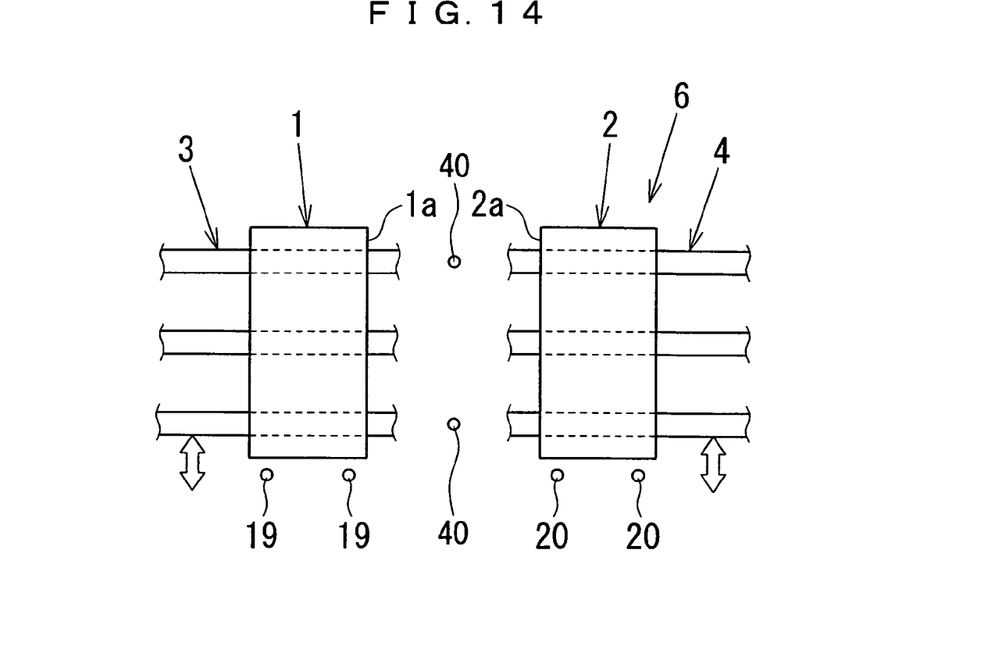
FIG. 14 is an illustrative drawing of the workpiece positioning device, depicting blank members immediately after being loaded on a magnet conveyer by the workpiece supply device.

Next, the operation of the butt welding system is described. First, the workpiece supply devices 5 pick up the uppermost one of the blank members 1, 2 (steel plates) loaded on each material palette 17 to convey the members to the magnet conveyers 3, 4. Here, since the suction pads 14 of each pad frame 13 that are arranged at the center are mounted at positions lower than those of the suction pads 14 arranged in the other rows (outside rows), each blank member 1, 2 is conveyed in a sagging state, thereby preventing a suction error and suction drop. Then, as depicted in FIG. 14, when the conveyed blank members 1, 2 are loaded on the magnet conveyers 3, 4 of the workpiece positioning device 6, the magnet conveyers 3, 4 are moved to one side (lower side as viewed in FIG. 14) in the direction of the welding line (vertical direction as viewed in FIG. 14), thereby moving the blank members 1, 2 loaded on the magnet conveyers 3, 4 to one side in the direction of the welding line. Then, the one side of each blank member 1, 2 abuts on each positioning pin 19, 20, so that the blank members 1, 2 can be positioned in the direction of the welding line.

Next, after each blank member 1, 2 is positioned in the direction of the welding line, each positioning pin 40 ascends to drive the magnet conveyers 3, 4 forward. Thereby, each blank member 1, 2 is moved forward (the blank member 1 is moved rightward as viewed in FIG. 14 by the magnet conveyer 3, whilst the blank member 2 is moved leftward as viewed in FIG. 14 by the magnet conveyer 4). Then, as depicted in FIG. 1, each butting portion 1*a*, 2*a* of each blank member 1, 2 abuts on the positioning pins 40, so that each blank member 1, 2 can be positioned in a butting direction (horizontal direction as viewed in FIG. 1). After each blank member 1, 2 is positioned, the positioning-state monitoring device measures the position of each blank member 1, 2 in the direction of the welding line. If determination is made as OK by the positioning-state monitoring device, each clamp bar 22 of each clamp unit of the workpiece gripping device 7 (gripping means) descends, thereby allowing the clamp unit to grip each blank member 1, 2 near the butting portion 1*a*, 2*a* of each member.

Here, concerning four compression coil springs 25 provided in parallel between the clamper 23 and the clamp bar 22 of each clamp unit, the spring force of the compression coil springs 25 arranged outside is set larger than that of the compression coil springs 25 arranged inside (at the center). Therefore, at the time of clamping, the center of the clamper 23 is prevented from being warped in a recessed shape, thereby preventing an insufficient close contact between each blank member 1, 2 and the jig base 21. Furthermore, as depicted in FIG. 5, the clampers 23 are provided in a tilted manner so that their ends close to the center of the clamp bar 22 of each clamper 23 are positioned lower, and the clampers 23 are provided so that the clampers 23 disposed closer to the center of the clamp bar 22 are positioned lower. Consequently, even when the center of each clamp bar 22 is deformed in a protruded shape due to the load applied during gripping each blank member 1, 2, the gripping force of the clampers 23 closer to the center of each clamp bar 22 is prevented from being made lower, thereby preventing insufficient close contact between each blank member 1, 2 and the jig base 21.

Figure 13:
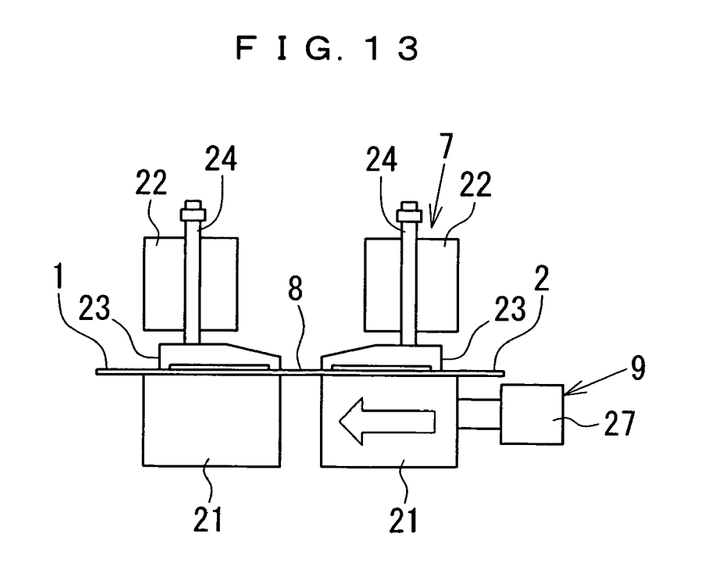
FIG. 13 is a front view depicting a state where each blank member gripped by each clamp unit of the gripping device is butted by the workpiece butting device.

On the other hand, if determination is made as NG (positioning defect) by the positioning-state monitoring device, the system is halted to actuate an alarm indicating a workpiece positioning defect. In this case, after the position of each blank member 1, 2 is corrected and the system is restarted, the positioning-state monitoring device measures the position of each blank member 1, 2 in the direction of the welding line again. After each blank member 1, 2 is gripped near each butting portions 1*a*, 2*a* by each clamping unit, each positioning pin 40 descends. Also, when each blank member 1, 2 is gripped by each clamp unit, each positioning pin 40 descends to retract. Next, as depicted in FIG. 13, each butting portion 1*a*, 2*a* of each blank member 1, 2 is butted together, and a butting load is applied to the butting portion 8 by the workpiece butting device 9. In this state, the workpiece matching device 10 (matching means) causes the blank member 2 to make a reciprocating motion toward the blank member 1 in the direction of the welding line (viewed from the angle of FIG. 13) by a moving amount of 5 mm in one way.

Thereby, the butting portions 1a, 2a of both of the blank members 1, 2 are matched, so that the gap of the butting portion 8 can be set equal to or smaller than 0.1 mm suitable for laser welding. After completion of matching of each butting portion 1a, 2a of each blank member 1, 2, the positioning-state monitoring device measures the gap of the butting portion 8 of the blank members 1, 2. When a determination is made as OK by the positioning-state monitoring device, the laser-output adjusting device measures a laser output of the power laser and adjusts the laser output of the oscillator based on the measurement results. On the other hand, when determination is made as NG (butting defect) by the positioning-state monitoring device, the system is halted to actuate an alarm indicating a butting defect. In this case, after the gap of the butting portion 8 is corrected and the system is restarted, the positioning-state monitoring device measures the gap of the butting portion 8 again. Also, when the laser output of the oscillator is adjusted by the laser-output adjusting device, the welding device (welding means) starts laser welding of the buffing portion 8.

Concurrently with welding process, the pinhole detecting device (pinhole detecting means) measures the intensity of the reflected light of the laser light and determines the presence or absence of a pinhole (welding defect) in the welded portion 8 based on the measurement results. Here, when a determination is made as NG (pinhole detected) by the pinhole detecting device, the system actuates an alarm and outputs an NG (pinhole detected) signal to the outside. Furthermore, in the butt welding system, the bead-shape examining device measures, simultaneously with welding, the bead height of the welded portion 8 and the height of each blank member 1, 2 on both sides of each welded portion 8 based on image data obtained by the image shot by the CCD camera 35, and makes OK/NG determination for the welded portion 8 based on the measurement results. When determination is made as NG (welding defect) by the bead-shape examining device, the system also actuates an alarm and outputs an NG (welding defect) signal to the outside. Then, in the butt welding system, after completion of welding, each clamp bar 22 of each clamp unit of the workpiece gripping device 7 ascends to release the gripping of a product (tailored blank member) by each clamp unit, and then the product is conveyed by each magnet conveyer 3, 4 of the workpiece positioning device 6. The conveyed product is transferred and loaded on a material palette by a predetermined conveying device.

In the present embodiment, the following effects can be achieved.

In the butt welding system, each butting portion 1a, 2a of each blank member 1, 2 (steel plate) is jointed together, and the predetermined butting load is applied to the butting portion 8. In this state, the blank members 1, 2 are relatively moved in the direction of the welding line, thus matching the butting portion 8 (the butting portion 1a of the blank member 1 and the butting portion 2a of the blank member 2). Consequently, projections and recesses formed on each butting portion 1a, 2a) of each blank member 1, 2 are flattened, and linear precision of each butting portion 1a, 2a of each blank member 1, 2 is enhanced as compared with the case where the butting portions are not matched. Since the gap is reduced extremely at the butting portion 8, welding is facilitated at the butting portion 8. Good welding beads are thereby obtained and the quality of a product is ensured.

Also, in the butt welding system, a plurality of clampers 23 of each clamp unit of the workpiece gripping device 7 (gripping means) are dividedly formed in the line of the welding direction, and a plurality of compression coil springs 25 (compression springs) are interposed in parallel between each clamper 23 and each clamp bar 22. The spring force of the compression coil springs 25 of each clamper 23 that are disposed outside is set larger than that of the compression coil springs 25 that are disposed inside (at the center), preventing each clamper 23 from being warped in a recessed shape. Each blank member 1, 2 can be thereby in close contact with each jig base 21 (base) over the entire length of each clamper 23. Furthermore, the clamper 23 are provided in a tilted manner so that the ends of the clampers 23 closer to the center of the clamp bar 22 are positioned lower, and the clampers 23 are provided so that the clampers 23 disposed closer to the center of the clamp bar 22 are positioned lower. Consequently, even when the center of each clamp bar 22 is deformed in a protruded shape due to the load applied during gripping each blank member 1, 2, an insufficient gripping force of the clampers 23 closer to the center of the clamp bar 22 can be prevented, allowing each blank member 1, 2 to be in secure contact with each jig base 21. Furthermore, the workpiece gripping device 7 is highly versatile and applicable to a variety of blank members.

Further, in the butt welding system, the pinhole detecting device (pinhole detecting means) measures the intensity of reflected light of the laser light in the optical system during welding, and determines the presence or absence of a pinhole (welding defect) in the welded portion 8 based on the measurement results. Therefore, when a pinhole occurs during welding, the pinhole can be detected immediately. Since a welding-defect examination is abolished that has been conventionally made in the examining process after completion of welding, the number of processes can be reduced to increase productivity and reduce manufacturing cost. Furthermore, when the reflected-light intensity data calculated based on the intensity of reflected light falls below the threshold successively by a predetermined number of pieces of data, a determination is made as NG (pinhole detected) by the pinhole detecting device. Therefore, as compared with the case where the presence or absence of a pinhole is determined only based on the intensity of reflected light, an erroneous determination can be prevented that a small recessed flaw at the welded portion 8 is a pinhole.

Still further, the butt welding system includes a laser-output adjusting device that converts transmitted light (laser light) of the optical system of the laser captured by the photosensor 37 to an electrical signal, and that adjusts the laser output of the oscillator based on the electrical signal. The laser output of the power laser is therefore measured for a short time (0.5 sec) to adjust the laser output of the oscillator. Consequently, the laser output can be adjusted per cycle without impairing productivity, preventing a welding defect ascribable to a laser output.

Here, the embodiment is not meant to be restricted to the above, and may be configured as follows.

In the workpiece supply device 5, the suction pads 14 (vacuum pads) are used as suction means. Alternatively, all or part of the suction pads 14 may be replaced by magnets as required.

Figure 15:
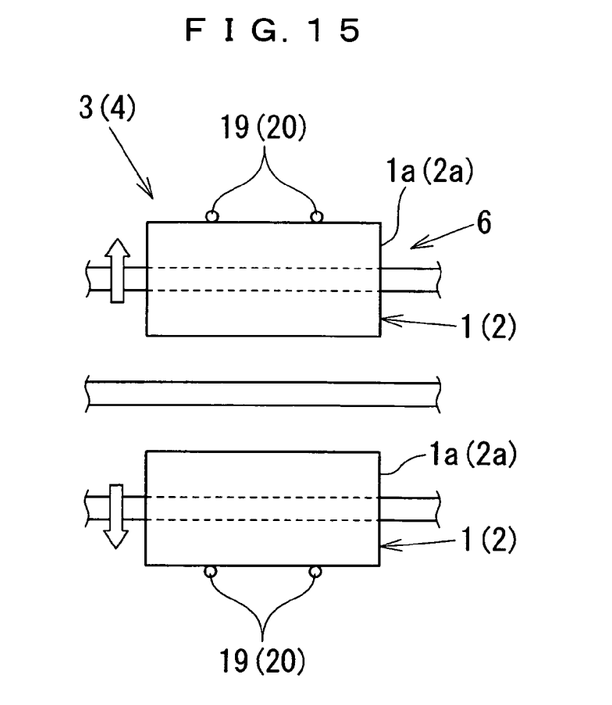
FIG. 15 is an illustrative drawing of another embodiment, depicting a state where two blank members are positioned by the workpiece positioning device.
Figure 16:
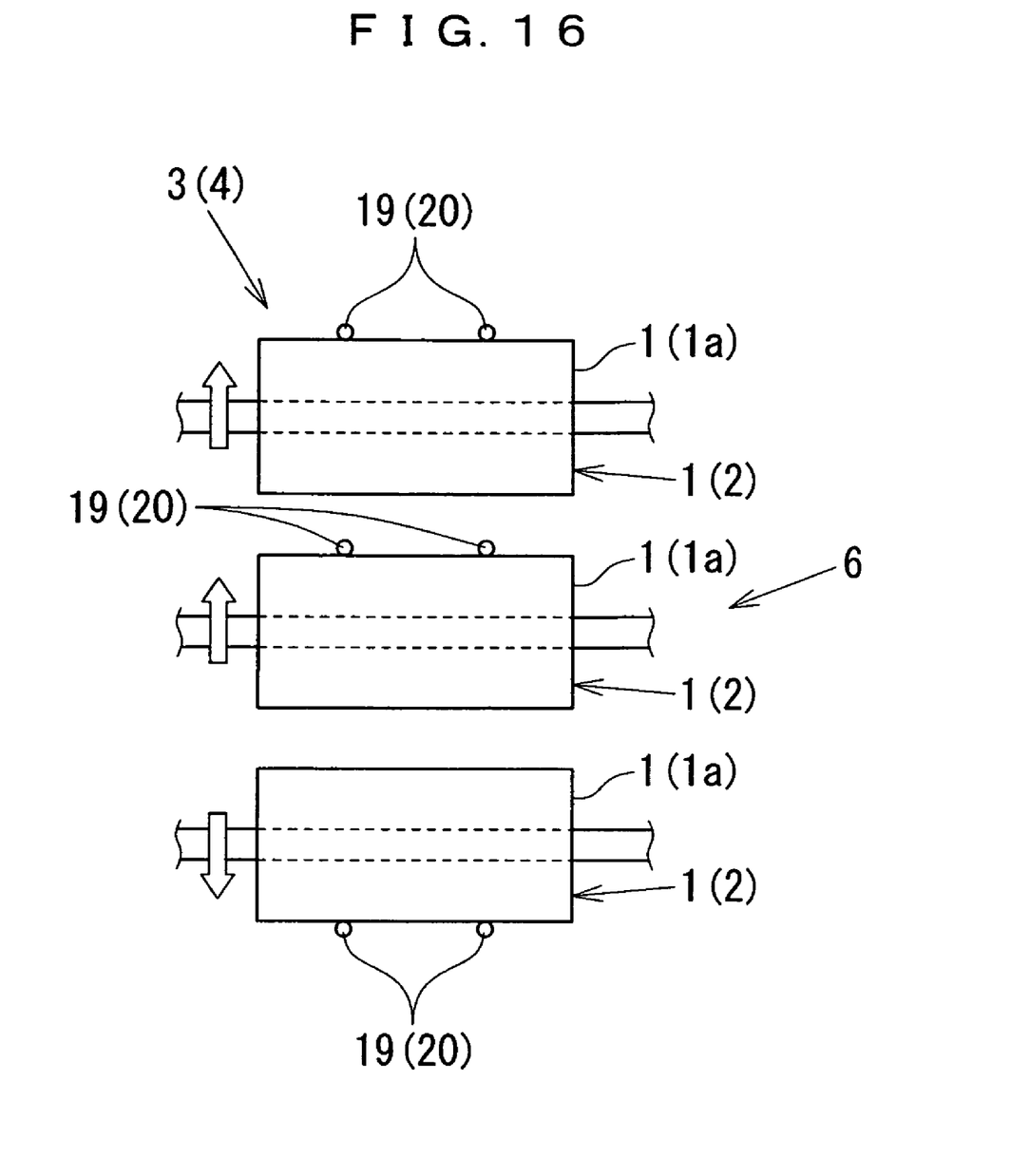
FIG. 16 is an illustrative drawing of still another embodiment, depicting a state where three blank members are positioned by the workpiece positioning device.

In the workpiece positioning device 6, each blank member 1, 2 taken one by one is positioned in the direction of the welding line by a pair of positioning pins 19, 20 of each magnet conveyer 3, 4. Alternatively, as depicted in FIGS. 15 and 16, two or three pairs of positioning pins 19, 20 may be provided to pick up two or three sheets of blank members 1, 2, and such a plurality of blank members 1, 2 may be simultaneously positioned in the direction of the welding line by a plurality of pairs of positioning pins 19, 20.

In the workpiece butting device 9, the clamp unit is driven by the driving force of a butting cylinder (hydraulic cylinder).

Alternatively, the clamp unit may be driven using, in place of such a hydraulic cylinder, a direct-acting unit that includes a servo motor, a ball screw and a direct-acting guide.

The workpiece matching device 10 causes the blank member 2 to make one reciprocating motion toward the blank member 1 in the direction of the welding line, in order to joint the blank members 1, 2 together. As required, the blank member 2 may be caused to make two or three reciprocating motions.

In the pinhole detecting device, the reflected light 32 captured by the photosensor 33 is separated into high-frequency components and low-frequency components, and then a difference between the high-frequency components and the low-frequency components is used as reflected-light intensity data. Alternatively, a quotient of the high-frequency components and the low-frequency components may be used as reflected-light intensity data.

In the laser-output adjusting device, transmitted light of the optical system is captured by the photosensor 37. Alternatively, the reflected light of the optical system may be captured by the photosensor 37 and be converted to an electrical signal. Also, a part of scattered light from a cooled metal beam clamper of the laser may be captured by the photosensor 37 and be converted to an electrical signal.

The present embodiment describes the case where the butt welding system is used to joint the blank members 1, 2 together. Alternatively, the butt welding system may be used to weld and joint the blank member 1 and a laser-welding steel plate, or laser-welding steel plates.

The invention claimed is:

1. A butt welding system of steel plate in which steel plates are welded at a butting portion for jointing, the system comprising:
    gripping means for gripping the steel plates to be jointed together near butting portions of the steel plates;
    butting means for butting the steel plates gripped by the gripping means at the butting portions, and for applying a predetermined butting load to the butting portion of the butted steel plates;
    matching means for relatively moving the steel plates butted by the butting means so as to match-slide the butting portions of the steel plates; and
    welding means for welding the butting portion of the steel plates along a welding line;
    wherein the gripping means includes
        a base that extends along the welding line and supports portions of lower surfaces of the steel plates near the butting portions;
        a clamp bar provided above the base so as to face the base;
        a plurality of clampers vertically disposed on the clamp bar so as to be vertically movable and arranged along the clamp bar;
        a plurality of compression springs interposed between the clamp bar and each clamper and disposed in parallel for each damper; and
        clamp-bar driving means for driving the clamp bar in a vertical direction; and
    wherein spring force of one or more of the compression springs disposed closer to an end of each clamper is set larger than that of one or more of the compression springs disposed closer to a center.

2. The butt welding system of steel plate according to claim 1, wherein, in the gripping means, each clamper is tilted with respect to the clamp bar so that an end closer to the center of the clamper bar is positioned lower and that one or more of the clampers disposed closer to the center of the clamper bar are positioned lower.

3. The butt welding system of steel plate according to claim 1, wherein the welding means is a laser welding device that radiates the butting portions with laser light generated by an oscillator from a laser head, and includes pinhole detecting means for detecting a pinhole of a welding bead based on an intensity of reflected light of the laser light in an optical system accommodated in the laser head.

4. The butt welding system of steel plate according to claim 3, wherein the pinhole detecting means includes: a photosensor provided to the laser head to capture the reflected light of the laser light; and a pinhole detection control device in which the reflected light captured by the photosensor is separated into high-frequency components and low-frequency components, in which a difference between the high-frequency components and the low-frequency components of the reflected light, or a quotient of the high-frequency components and the low-frequency components, is used as reflected-light intensity data, and in which a pinhole is detected when the reflected light intensity data falls below a threshold successively by a predetermined number of pieces of data.

5. The butt welding system of steel plate according to claim 3, further comprising:
    laser-output adjusting means for adjusting a laser output of the oscillator based on an intensity of transmitted light or reflected light of the laser light in an optical component of the laser head.

6. The butt welding system of steel plate according to claim 5, wherein the laser-output adjusting device includes: a photosensor provided to the laser head to capture the transmitted light or reflected light of the laser light; and a laser-output control device by which a laser output of the laser light is measured based on the transmitted light or reflected light of the laser light captured by the photosensor, and by which a laser-output adjusting signal calculated based on the measurement results is output to the oscillator.

7. A butt welding method of welding steel plates at a butting portion for jointing where a butt welding system including a gripping means for gripping the steel plates to be jointed together near butting portions of the steel plates is applied,
    wherein the gripping means includes: a base that extends along the welding line and supports portions of lower surfaces of the steel plates near the butting portions; a clamp bar provided above the base so as to face the base; a plurality of clampers vertically disposed on the clamp bar so as to be vertically movable and arranged along the clamp bar; and a plurality of compression springs interposed between the clamp bar and each clamper and disposed in parallel for each clamper; and clamp-bar driving means for driving the clamp bar in a vertical direction,
    wherein the spring force of one or more of the compression springs disposed closer to an end of each clamper is set larger than that of one or more of the compression springs disposed closer to a center, and
    wherein the clamp-bar driving means is adapted to lower the clamp bar, and each clamper in which to have larger gripping force at its more end than its more center grips the steel plates near butting portions of the steel plates;

then the steel plates butt together at their butting portions and a predetermined butting load is applied to the butting portion of the steel plates; in this state, the steel plates are relatively moved to match the butting portions of the steel plates; and then the butting portions of the steel plates are welded.

8. The butt welding method of steel plate according to claim 7, wherein the method is applied to butt welding when at least one of the steel plates to be jointed together is a welding steel plate.

* * * * *